(12) United States Patent
Matsumuro et al.

(10) Patent No.: US 7,656,980 B2
(45) Date of Patent: Feb. 2, 2010

(54) CLOCK SWITCHING CIRCUIT

(75) Inventors: Tomonori Matsumuro, Kyoto (JP); Masatoshi Sato, Gifu (JP); Hitoshi Yasuda, Gifu (JP); Kazumasa Takai, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 624 days.

(21) Appl. No.: 11/523,096

(22) Filed: Sep. 19, 2006

(65) Prior Publication Data

US 2007/0063744 A1 Mar. 22, 2007

(30) Foreign Application Priority Data

Sep. 21, 2005 (JP) ............... 2005-273360

(51) Int. Cl.
*H04L 7/00* (2006.01)
(52) U.S. Cl. .................................... 375/354
(58) Field of Classification Search ............... 375/354, 375/357, 224
See application file for complete search history.

(56) References Cited

U.S. PATENT DOCUMENTS 4,229,699 A * 10/1980 Frissell .................. 327/114
7,246,286 B2 * 7/2007 Hsieh ..................... 714/731
2004/0202264 A1 * 10/2004 Choi ...................... 375/354
2008/0272814 A1 * 11/2008 Chiang et al. ............. 327/175

FOREIGN PATENT DOCUMENTS

| JP | 07-248843 A | 9/1995 |
|---|---|---|
| JP | 2003-223237 A | 8/2003 |
| JP | 2003-347931 A | 12/2003 |
| JP | 2004-054350 A | 2/2004 |
| JP | 2005-050327 A | 2/2005 |

\* cited by examiner

*Primary Examiner*—Tesfaldet Bocure
(74) *Attorney, Agent, or Firm*—Morrison & Foerster LLP

(57) ABSTRACT

This invention provides a clock switching circuit that can switch clocks without causing a hazard or a distortion of a duty ratio of the clocks. The clock switching circuit of this invention includes a first synchronization circuit that synchronizes a clock selection signal with a first clock, a second synchronization circuit that synchronizes with a second clock the clock selection signal that has been synchronized with the first clock by the first synchronization circuit and a clock selection circuit that outputs "1", that is a high level, in synchronization with the clock selection signal that has been synchronized with the first clock by the first synchronization circuit and after that selects the second clock in synchronization with the clock selection signal that has been synchronized with the second clock by the second synchronization circuit.

8 Claims, 4 Drawing Sheets

CLOCK SWITCHING CIRCUIT

CROSS-REFERENCE OF THE INVENTION

This application claims priority from Japanese Patent Application No. 2005-273360, the content of which is incorporated herein by reference in its entirety.

BACKGROUND OF THE INVENTION

1. Field of the Invention

This invention relates to a clock switching circuit that switches between first and second clocks that are not synchronized with each other and have different frequencies.

2. Description of the Related Art

A conventional clock switching circuit switches between a first clock CLK1 and a second clock CLK2 simply in response to a clock selection signal SEL, as shown in FIG. 6. Japanese Patent Application Publication Nos. H07-248843, 2003-223237, 2003-347931, 2004-54350 and 2005-50327 disclose various clock switching circuits.

With the clock switching circuit which switches between the first clock CLK1 and the second clock CLK2 simply in response to the clock selection signal SEL, however, there arises a hazard, that is, an unwanted pulse, and a distortion of a duty ratio of the clock when the first clock CLK1 and the second clock CLK2 are not in synchronization with each other and have different frequencies, resulting in malfunctioning of a circuit that operates with the clocks. For example, when the circuit that operates with the clocks is a flip-flop, the flip-flop may fall into a metastable state because of irrelevant setup/hold or the like.

SUMMARY OF THE INVENTION

This invention provides a clock switching circuit that switches between first and second clocks that are not synchronized with each other and different in frequency from each other, including a first synchronization circuit that synchronizes a clock selection signal with the first clock, a second synchronization circuit that synchronizes with the second clock the clock selection signal that has been synchronized with the first clock by the first synchronization circuit, and a clock selection circuit that outputs a high level or a low level in synchronization with the clock selection signal that has been synchronized with the first clock by the first synchronization circuit and after that selects the second clock in synchronization with the clock selection signal that has been synchronized with the second clock by the second synchronization circuit.

DETAILED DESCRIPTION OF THE INVENTION

Figure 1:
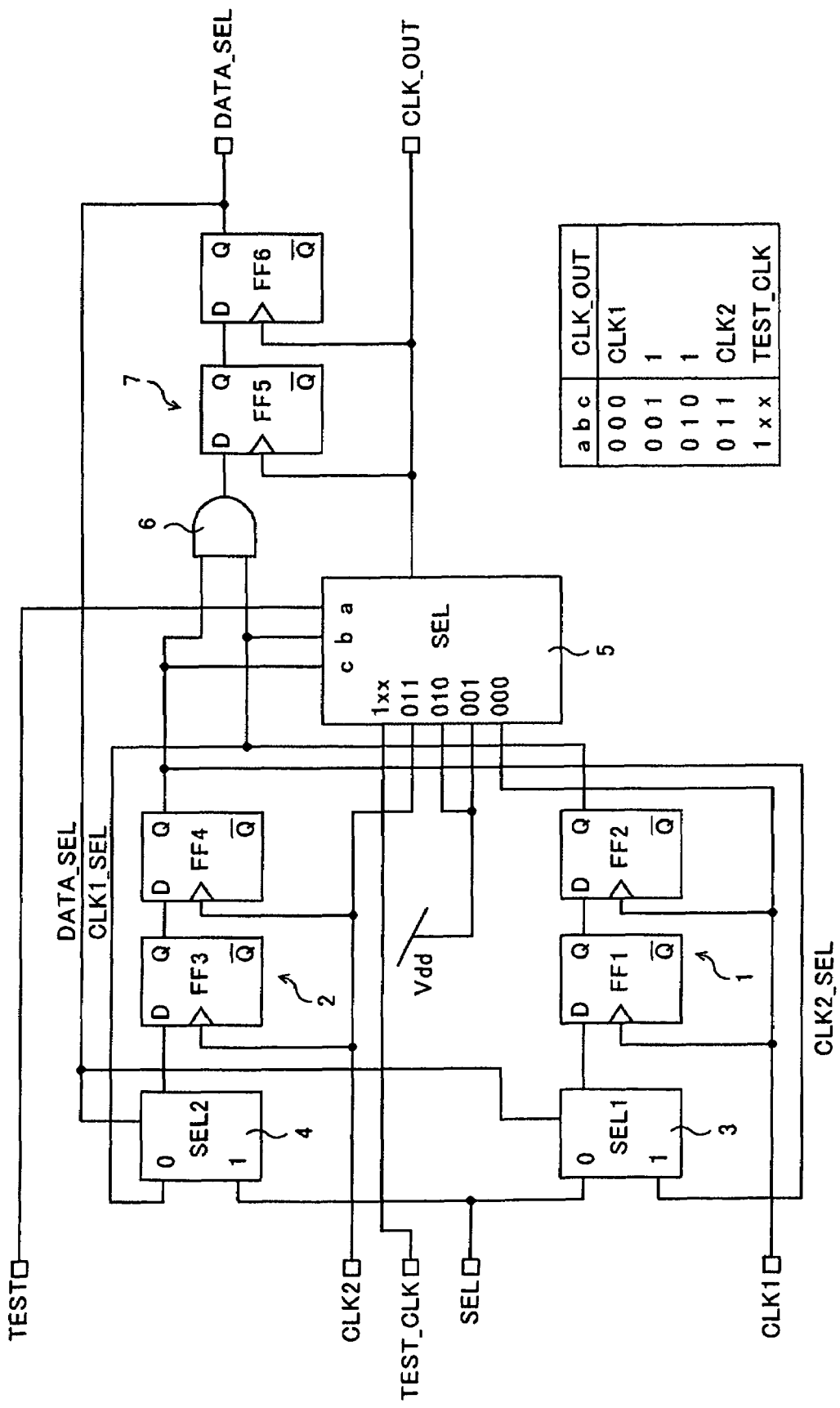
FIG. 1 is a circuit diagram of a clock switching circuit according to an embodiment of this invention.

Next, a clock switching circuit according to an embodiment of this invention will be explained referring to the drawings. FIG. 1 is a circuit diagram of the clock switching circuit.

A first synchronization circuit 1 is composed of two flip-flops FF1 and FF2 connected in series, and uses a first clock CLK1 as a reference clock for synchronization. A second synchronization circuit 2 is composed of two flip-flops FF3 and FF4 connected in series, and uses a second clock CLK2 as a reference clock for synchronization.

A first selection circuit 3 selects either a clock selection signal SEL or an output signal CLK2_SEL from the second synchronization circuit 2, in response to a control signal DATA_SEL. That is, the clock selection signal SEL is selected when the control signal DATA_SEL is "0", while the output signal CLK2_SEL from the second synchronization circuit 2 is selected when the control signal DATA_SEL is "1". The selected signal is inputted to the first synchronization circuit 1.

A second selection circuit 4 selects either the clock selection signal SEL or an output signal CLK1_SEL from the first synchronization circuit 1, in response to the control signal DATA_SEL. That is, the clock selection signal SEL is selected when the control signal DATA_SEL is "1", while the output signal CLK1_SEL from the first synchronization circuit 1 is selected when the control signal DATA_SEL is "0". The selected signal is inputted to the second synchronization circuit 2.

A test signal TEST is inputted to a terminal "a" in a clock selection circuit 5, the output signal CLK1_SEL from the first synchronization circuit 1 is inputted to a terminal "b" in the clock selection circuit 5 and the output signal CLK2_SEL from the second synchronization circuit 2 is inputted to a terminal "c" in the clock selection circuit 5. The clock selection circuit 5 outputs an output signal CLK_OUT according to a truth table in FIG. 1, in response to the inputted signals. That is, the first clock CLK1 is outputted when (a, b, c)=(0, 0, 0), "1" (a high level=power supply electric potential Vdd) is outputted when (a, b, c)=(0, 0, 1) or (0, 1, 0), the second clock CLK2 is outputted when (a, b, c)=(0, 1, 1), and a test clock TEST_CLK is outputted for a scan test when (a, b, c)=(1, x, x). Here, x may be either "1" or "0".

A detection circuit 6 detects an event where both the output signal CLK1_SEL from the first synchronization circuit 1 and the output signal CLK2_SEL from the second synchronization circuit 2 become the same level, that is, the both outputs become "1" or both outputs become "0". In this embodiment, an AND circuit is used as an example of the detection circuit 6 to detect the event where both the output signal CLK1_SEL from the first synchronization circuit 1 and the output signal CLK2_SEL from the second synchronization circuit 2 are "1". The detection circuit 6 may detect the event where both signals are "1" or the event where both signals are "0," because the output signal CLK_OUT from the clock selection circuit 5 is fixed to either "1" or "0" in a transition state of the clock selection and an output from the AND circuit 6 is not transferred into a third synchronization circuit 7 described below.

The third synchronization circuit 7 is composed of two flip-flops FF5 and FF6, and uses either the first clock CLK1 or the second clock CLK2 selected by the clock selection circuit 5 as a reference clock for synchronization. An output signal from the third synchronization circuit 7 is the control signal DATA_SEL to the first and second selection circuits 3 and 4 described above. A purpose of delaying the control signal DATA_SEL to the first and second selection circuits 3 and 4 by a few clock cycles is to change the control of the first and second selection circuits 3 and 4 in a stable state in which the selection of the clock has been securely completed. The control signal DATA_SEL can also be used as a control signal for a later stage of circuit that operates with the first clock CLK1 or the second clock CLK2 selected by the clock selection circuit 5 as well as changing the control of the first and second selection circuits 3 and 4.

Each of the first, second and third synchronization circuits 1, 2 and 7 is preferably made of two or more than two flip-flops in order to avoid falling into a metastable state.

Next, an operation of the clock switching circuit described above will be explained referring to FIG. 2.

It is assumed that the first clock CLK1 and the second clock CLK2 are not synchronized with each other and have different frequencies. First, the clock selection signal SEL changes from "0" to "1" in order to select the second clock CLK2, while the first clock CLK1 has been selected by the clock selection circuit 5. Because the control signal DATA_SEL is "0" at that time, the first selection circuit 3 selects the clock selection signal SEL and the second selection circuit 4 selects the output signal CLK1_SEL from the first synchronization circuit 1.

Figure 2:
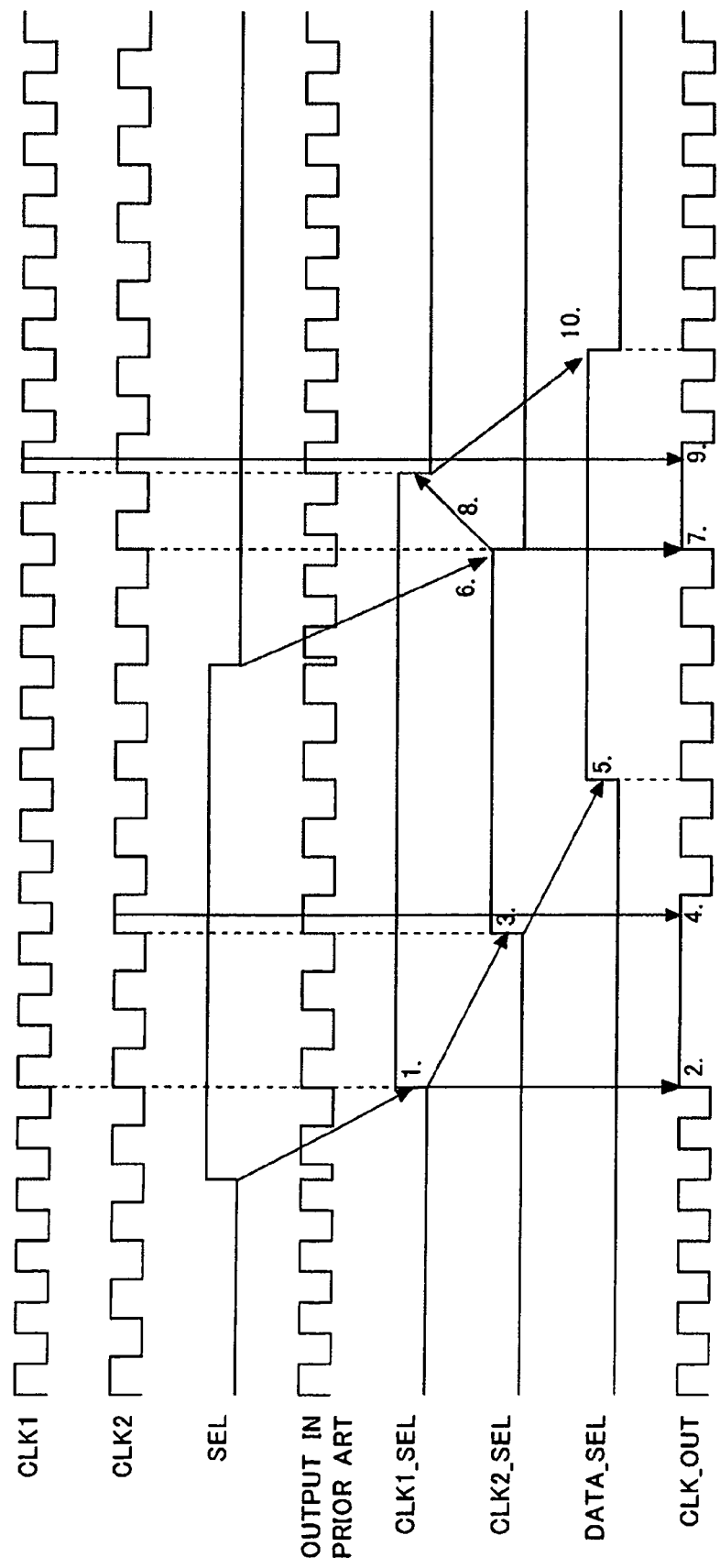
FIG. 2 is a timing chart showing operation of the clock switching circuit according to the embodiment of this invention.

Then, the clock selection signal SEL is synchronized with the first clock CLK1 by the first synchronization circuit 1, and is outputted as the output signal CLK1_SEL from the first synchronization circuit 1 (1 in FIG. 2). And the clock selection circuit 5 outputs "1" (the high level=Vdd) in synchronization with a rise of the output signal CLK1_SEL from the first synchronization circuit 1, which has been synchronized with the first clock CLK1 (2 in FIG. 2). The output signal CLK1_SEL from the first synchronization circuit 1 is selected by the second selection circuit 4 and inputted to the second synchronization circuit 2 to be synchronized with the second clock CLK2 (3 in FIG. 2). The clock selection circuit 5 selects and outputs the second clock CLK2 in synchronization with a rise of the output signal CLK2_SEL from the second synchronization circuit 2, which has been synchronized with the second clock CLK2 (4 in FIG. 2).

The output signal from the AND circuit 6 changes from "0" to "1" when the output signal CLK2_SEL from the second synchronization circuit 2 rises to "1". The output signal from the AND circuit 6 is synchronized with the second clock CLK2 by the third synchronization circuit 7. Then, the control signal DATA_SEL that is the output signal from the third synchronization circuit 7 changes from "0" to "1". With this, the second selection circuit 4 is switched to select the clock selection signal SEL and the first selection circuit 3 is switched to select the output signal CLK2_SEL from the second synchronization circuit 2 (5 in FIG. 2).

After that, the clock selection signal SEL changes from "1" to "0". Then, the clock selection signal SEL is synchronized with the second clock CLK2 by the second synchronization circuit 2 (6 in FIG. 2). And the clock selection circuit 5 outputs "1" (the high level=Vdd) in synchronization with a fall of the output signal CLK2_SEL from the second synchronization circuit 2, which has been synchronized with the second clock CLK2 (7 in FIG. 2). The output signal CLK2_SEL from the second synchronization circuit 2 is selected by the first selection circuit 3, inputted to the first synchronization circuit 1, and synchronized with the first clock CLK1 (8 in FIG. 2). The clock selection circuit 5 selects and outputs the first clock CLK1 in synchronization with a fall of the output signal CLK1_SEL from the first synchronization circuit 1, which has been synchronized with the first clock CLK1 (9 in FIG. 1).

The output signal from the AND circuit 6 changes from "1" to "0" when the output signal CLK2_SEL from the second synchronization circuit 2 falls to "0". The output signal of the AND circuit 6 is synchronized with the first clock CLK1 by the third synchronization circuit 7. Then, the control signal DATA_SEL, that is the output signal from the third synchronization circuit 7, changes from "1" to "0". With this, the first selection circuit 3 is switched to select the clock selection signal SEL and the second selection circuit 4 is switched to select the output signal CLK1_SEL from the first synchronization circuit 1 (10 in FIG. 2).

By synchronizing the clock selection signal SEL with the clock selected by the clock selection circuit 5 as described above, the output of the clock selection circuit 5 can be switched to "0" or "1", a state in which the clock is halted, at a timing that does not cause a hazard or a distortion of the duty ratio, even when the selection signal SEL is unsynchronized. And by further synchronizing with the unselected clock the clock selection signal SEL that has been synchronized with the selected clock, the output of the clock selection circuit 5 can be switched from the state in which the clock is halted to a state in which the selected clock is outputted, at a timing that does not cause the hazard or the distortion of the duty ratio.

Figure 3:
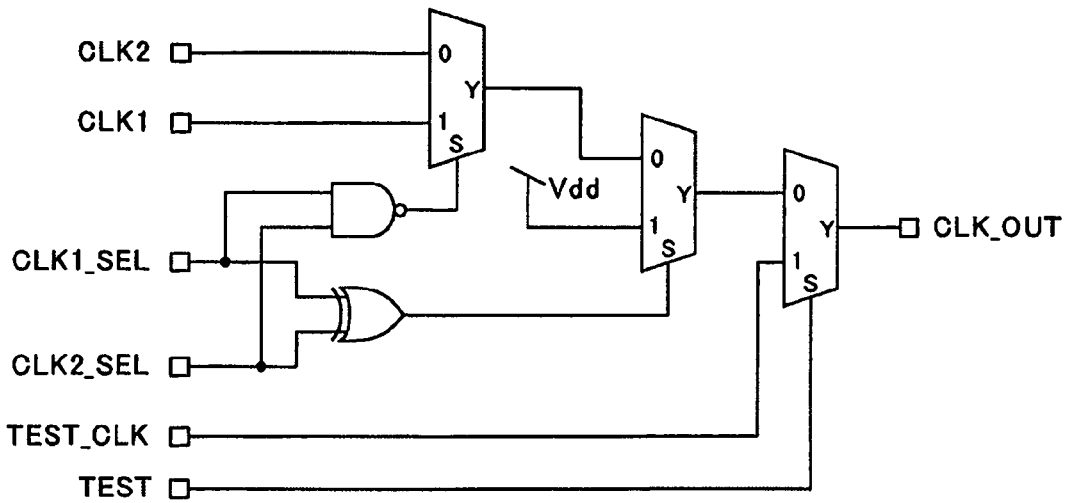
FIG. 3 is a circuit diagram of a concrete clock selection circuit.
Figure 4:
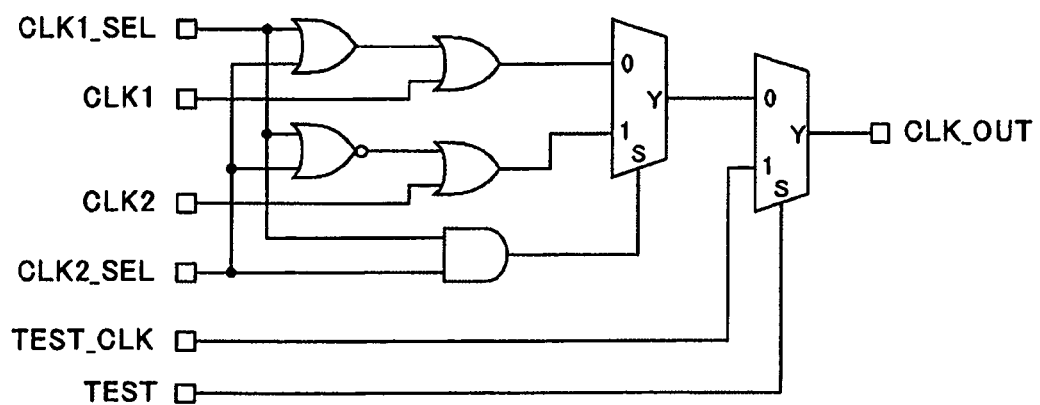
FIG. 4 is a circuit diagram of a concrete clock selection circuit.
Figure 5:
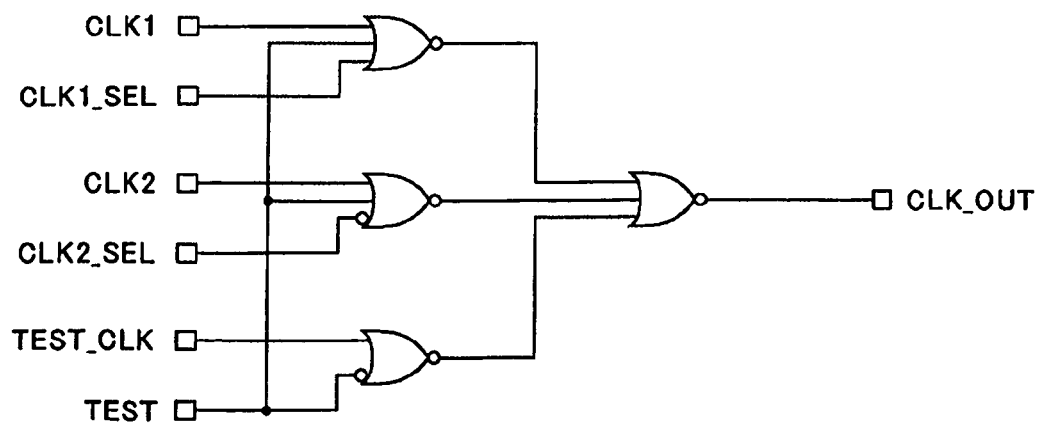
FIG. 5 is a circuit diagram of a concrete clock selection circuit.
Figure 6:
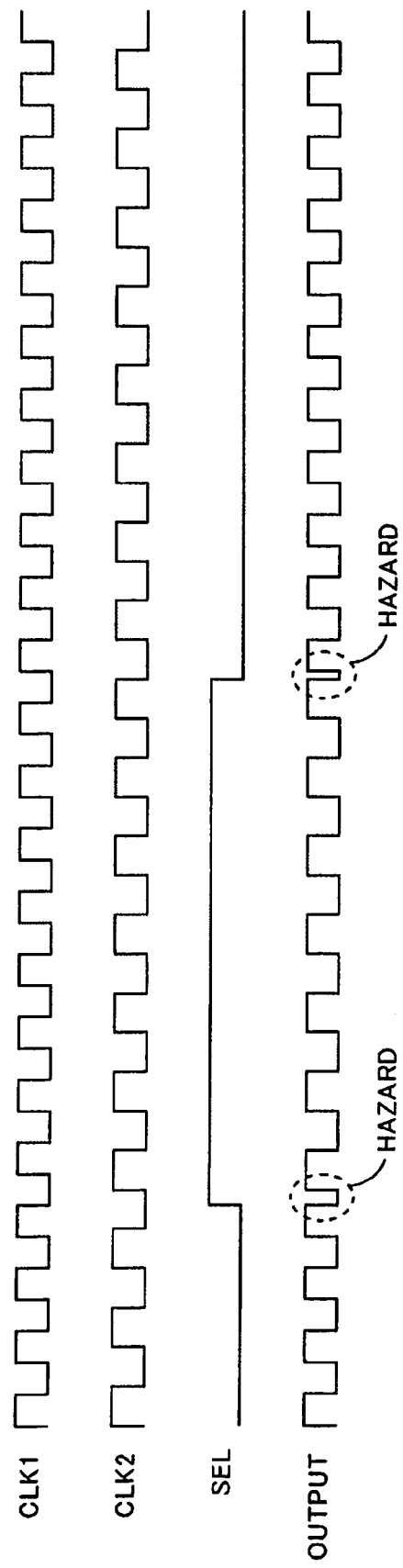
FIG. 6 is a timing chart showing operation of a clock switching circuit according to a prior art.

Examples of circuits implementing the clock selection circuit 5 are shown in FIGS. 3, 4 and 5. An output from the circuit shown in FIG. 5 differs from the truth table shown in FIG. 1 only when (a, b, c)=(0, 0, 1). However, because (a, b, c)=(0, 0, 1) does not take place in the embodiment as understood from FIG. 2, the circuit shown in FIG. 5 practically functions in the same way as the other circuits shown in FIGS. 3 and 4 in actual operations. Forming the clock selection circuit 5 as one of the examples makes logic to select between the first and second clocks CLK1 and CLK2 reflect both the output signal CLK1_SEL from the first synchronization circuit 1 and the output signal CLK2_SEL from the second synchronization circuit 2 to prevent the hazard and the like from occurring in the clock selection circuit 5.

With the clock switching circuit according to the embodiment of this invention, the clocks can be switched without causing the hazard and the distortion of the duty ration that would lead to malfunctioning of the circuit.

What is claimed is:

1. A clock switching circuit providing alternately a first clock and a second clock that have different frequencies, comprising:
  a first synchronization circuit that synchronizes the first clock and a clock selection signal;
  a second synchronization circuit that synchronizes the second clock and the clock selection signal; and
  a clock selection circuit that outputs a high level output, the first clock or the second clock in synchronization with the clock selection signal or outputs a low level output, the first clock or the second clock in synchronization with the clock selection signal.

2. The clock switching circuit of claim 1, wherein the clock selection circuit is provided with a test clock and outputs the test clock in response to a test signal.

3. The clock switching circuit of claim 2, wherein each of the first and second synchronization circuits comprises two or more flip-flop circuits.

4. The clock switching circuit of claim 2, wherein the clock selection circuit is provided with a test clock and outputs the test clock in response to a test signal.

5. A clock switching circuit providing alternately a first clock and a second clock that have different frequencies, comprising:

a first synchronization circuit that uses the first clock as a reference clock for synchronization and synchronizes the first clock and a clock selection signal synchronized with the first clock or the second clock;

a second synchronization circuit that uses the second clock as a reference clock for synchronization and synchronizes the second clock and the clock selection signal synchronized with the first clock or the second clock; and a clock selection circuit configured to output a low level output or a high level output in synchronization with the clock selection signal synchronized with the first clock by the first synchronization circuit and subsequently select the second clock in synchronization with the clock selection signal synchronized with the second clock by the second synchronization circuit when the clock selection signal changes so as to select the second clock, and to output the low level output or the high level output in synchronization with the clock selection signal synchronized with the second clock by the second synchronization circuit and subsequently select the first clock in synchronization with the clock selection signal synchronized with the first clock by the first synchronization circuit when the clock selection signal changes so as to select the first clock.

6. The clock switching circuit of claim 5, further comprising a first selection circuit that selects and inputs to the first synchronization circuit the clock selection signal that has been synchronized with the second clock by the second synchronization circuit and a second selection circuit that selects and inputs to the second synchronization circuit the clock selection signal that has been synchronized with the first clock by the first synchronization circuit.

7. The clock switching circuit of claim 6, further comprising a detection circuit that finds, that an output signal from the first synchronization circuit and an output signal from the second synchronization circuit are at the same level and a third synchronization circuit that synchronizes an output of the detection circuit and the first clock or the second clock that is selected by the clock selection circuit, wherein the first and second selection circuits are controlled by an output of the third synchronization circuit.

8. The clock switching circuit of claim 7, wherein each of the first, second and third synchronization circuits comprises two or more flip-flop circuits.

* * * * *